A. H. HAWLEY.
PLATEN MECHANISM FOR ACCOUNTING MACHINES.
APPLICATION FILED SEPT. 11, 1917.
1,295,307.  Patented Feb. 25, 1919.
7 SHEETS—SHEET 1.
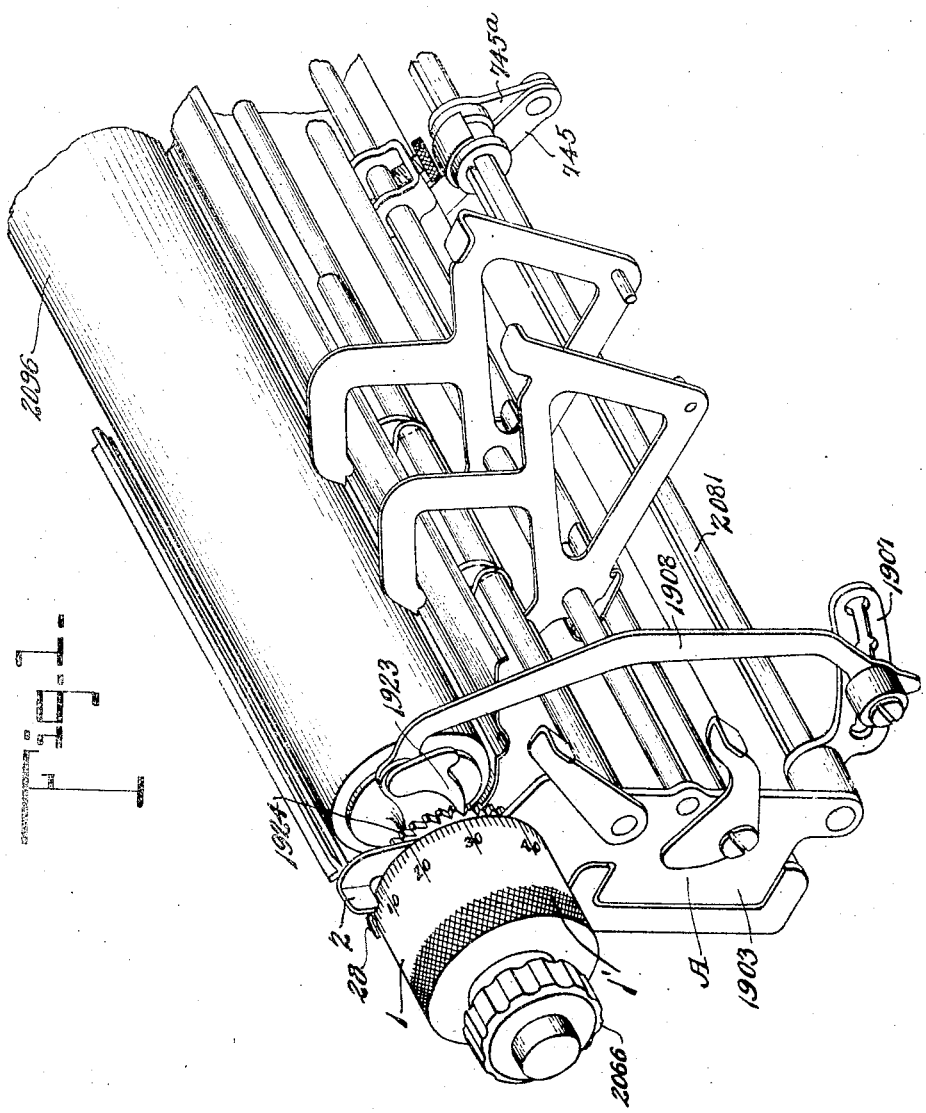
WITNESS
Wagner.
INVENTOR
A. H. Hawley
ATTORNEY

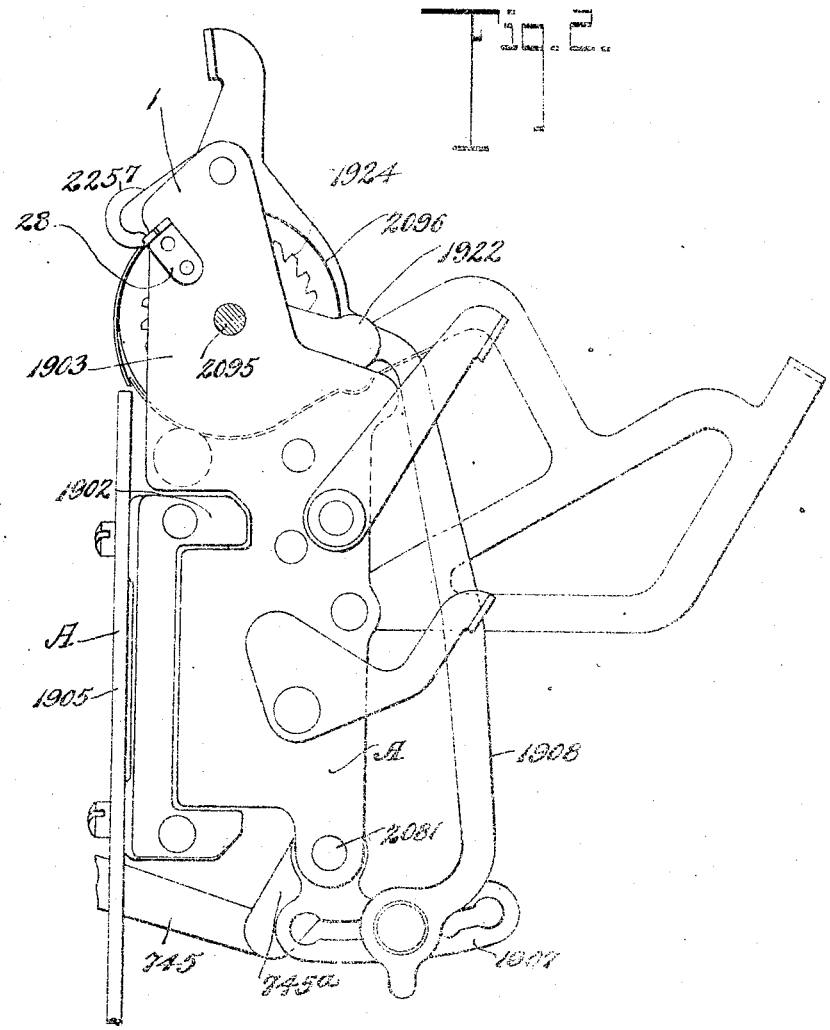

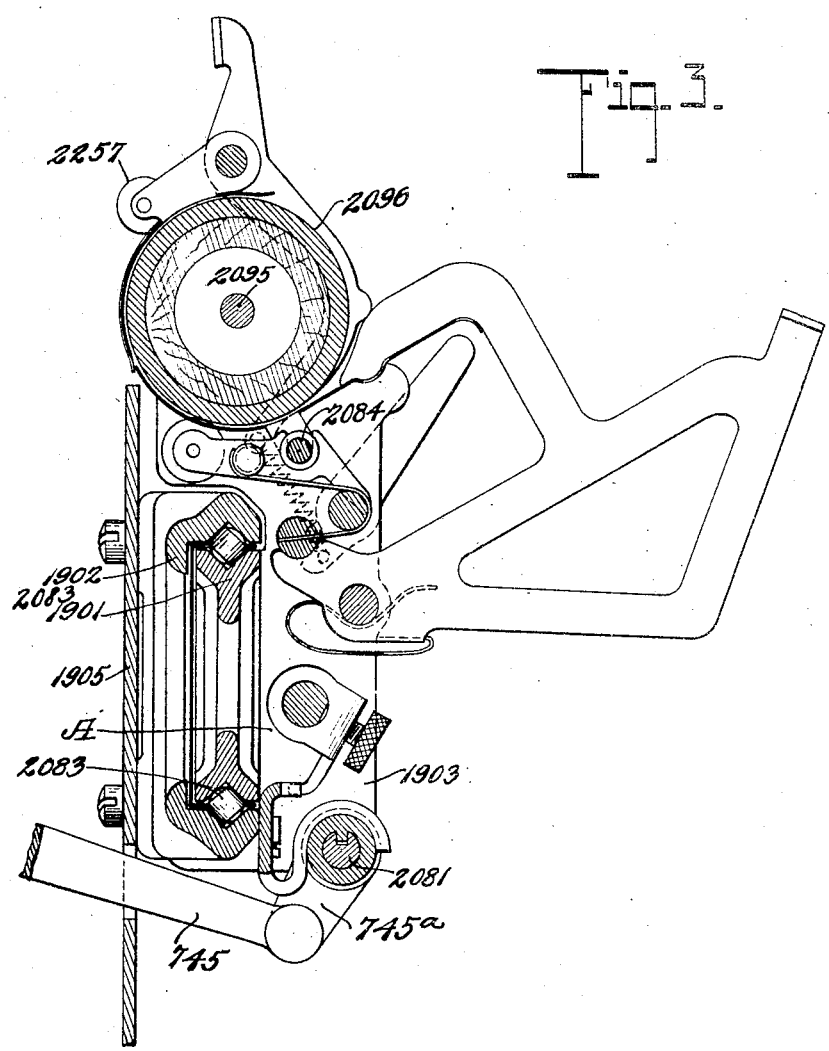

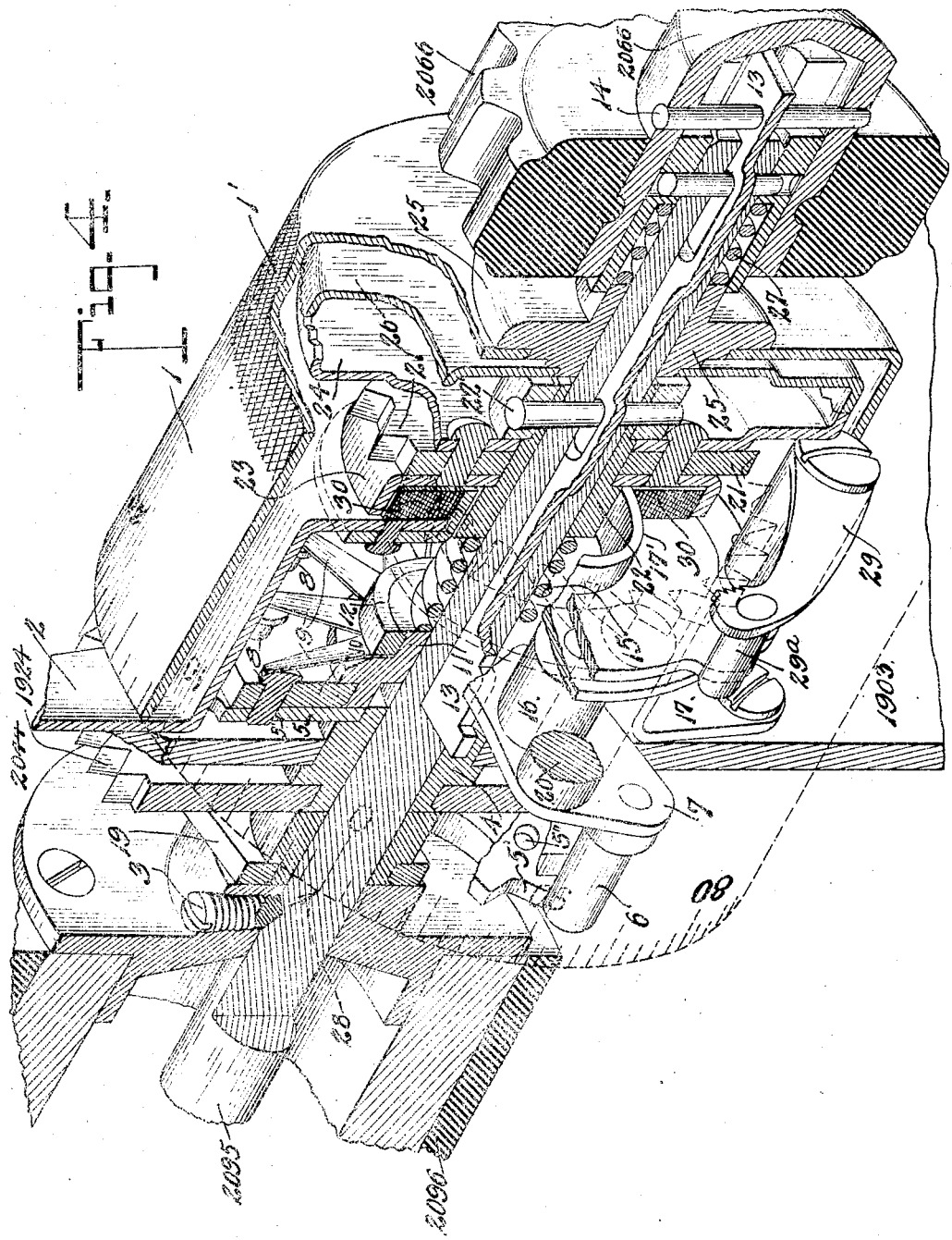

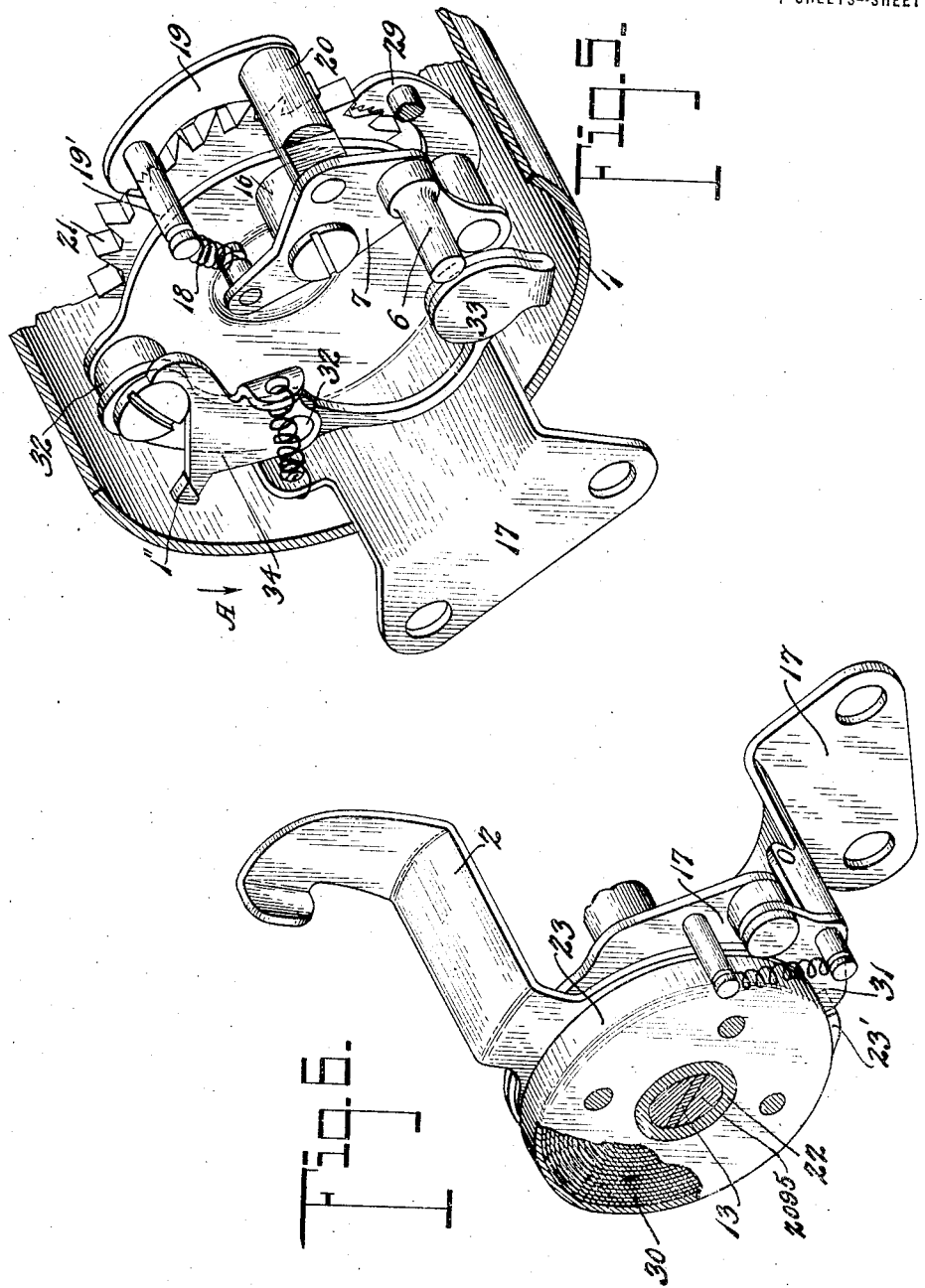

A. H. HAWLEY.
PLATEN MECHANISM FOR ACCOUNTING MACHINES.
APPLICATION FILED SEPT. 11, 1917.

1,295,307.

Patented Feb. 25, 1919.
7 SHEETS—SHEET 6.

WITNESS
E.H.Wagner.

INVENTOR
A.H.Hawley
By
ATTORNEY

A. H. HAWLEY.
PLATEN MECHANISM FOR ACCOUNTING MACHINES.
APPLICATION FILED SEPT. 11, 1917.
1,295,307.
Patented Feb. 25, 1919.
7 SHEETS—SHEET 7.
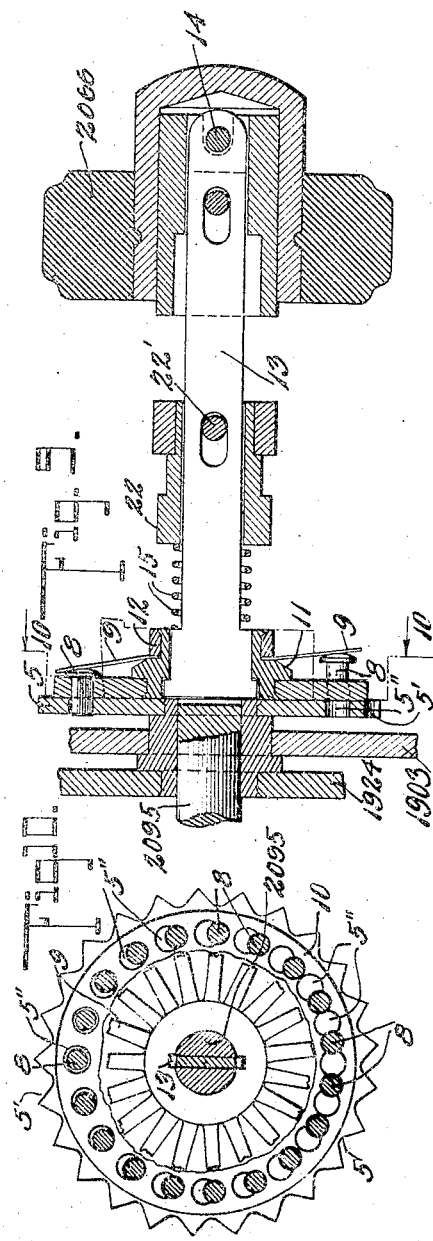
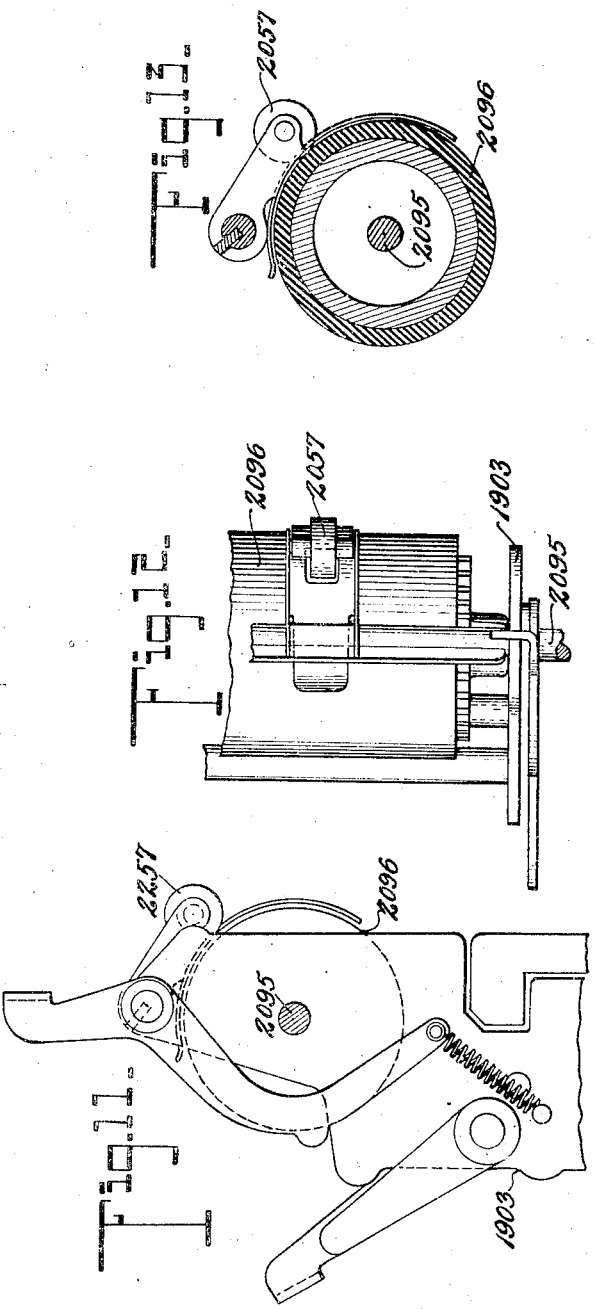
WITNESS
C. H. Wagner
INVENTOR
A. H. Hawley
By J. H. Ross
ATTORNEY

UNITED STATES PATENT OFFICE.

AMOS H. HAWLEY, OF NORWOOD, OHIO, ASSIGNOR TO INTERNATIONAL MONEY MACHINE COMPANY, OF TERRE HAUTE, INDIANA.

PLATEN MECHANISM FOR ACCOUNTING-MACHINES.

1,295,307.  Specification of Letters Patent.  Patented Feb. 25, 1919.

Application filed September 11, 1917. Serial No. 190,802.

*To all whom it may concern:*

Be it known that I, AMOS H. HAWLEY, a citizen of the United States, residing at Norwood, in the county of Hamilton and State of Ohio, have invented certain new and useful Improvements in Platen Mechanism for Accounting-Machines, of which the following is a specification.

This invention appertains to accounting machines of those types which are equipped with a platen for facilitating the printing of accounting transactions.

In its general organization the invention involves the provision of novel feeding mechanism for platens of accounting machines, mechanism which is novel particularly in respect to provisions for direct manipulation of the platen for adjusting the paper properly in relation to the printing type coöperating with the platen. Additionally, there is provided a novel form of indicator associated with the platen in such a manner as to advise the operator visually or audibly, or in both ways, as to the amount of movement which may predeterminately be given to the platen to advance the paper the required amount for a particular operation or operations. The feature just mentioned is useful especially in order to call attention of the operator to the fact that the bottom portion of a sheet of paper on which tabulations are being performed has been reached.

Ancillary to the indicator construction just referred to, the improvements hereof comprise an especially advantageous means for direct manual restoration of the indicator to a normal or zero position, mechanism which is useful primarily to quickly normalize the indicator when the complete predetermined amount of movement of the platen for which the indicator may happen to be set, is decided upon as not necessary to be performed at the particular time.

As an incident to the development of the several features or mechanisms above referred to as essential parts of this invention, a special object in view has been the production of means combining the constructional features set forth, which means is especially compact in construction so as to conduce to the economy of space taken up thereby, and the employment of the fewest number of parts possible, all of which is an ever present desideratum in the art of accounting machines.

In the accompanying drawings:

Figure 1 is a partial perspective view of the paper carriage of an International adding machine, and showing generally the platen feed mechanism and indicator associated therewith;

Fig. 2 is an end elevation of the same;

Fig. 3 is a vertical section of the construction shown in Figs. 1 and 2;

Fig. 4 is a very much exaggerated enlargement of the platen adjusting and indicating mechanism, the view being an isometric perspective with parts in section and parts broken away;

Fig. 5 is an enlarged detail view somewhat fragmentary, and illustrative more fully of the bell signal means of the indicator;

Fig. 6 is a perspective view with the spring clutch member partly broken away and illustrating more particularly the indicator restoring device;

Fig. 9 is a sectional view partly broken away, taken through the platen shaft and showing clearly the manner in which the operating knob is connected for shifting the pin carrier for manual adjustment of the platen;

Fig. 10 is a sectional view about on the line 10—10 of Fig. 9;

Figs. 11, 12 and 13 are respectively end, top plan, and sectional views, showing the paper detents coöperative with the platen and the controlling means for said device.

The platen mechanism embodying the present improvements is illustrated in connection with the paper carriage of the International adding machine. As seen best in Figs. 1 to 3 of the drawings, the carriage A comprises the side frames 1903 and slides on suitable bearings 2083 disposed in races provided in the upper and lower portions of a race plate 1901 on the carriage A, and corresponding races in a race plate 1902 which is fixedly mounted upon the back plate of the adding machine, the latter not illustrated. The mounting of the carriage is seen best in Fig. 3, the platen 2096 being mounted upon a main shaft 2095 supported by bearings in the side frames 1903 aforesaid.

Since the construction and arrangement of the parts of the carriage is not material to this invention, it may be briefly noted that the platen 2096 is operated by means of a link 745 seen best in Figs. 1 to 3, which link 745 is connected to an arm 745ª in such a manner that when the link 745 is actuated as an incident to operation of the main shaft of the adding machine the arm 745ª will rock the shaft 2081, thereby rocking an arm 1907 rotatable with the shaft 2081. The arm 1907 has adjustable connection with the actuating link 1908, the latter in turn operating the feed pawl 1923 which acts upon the line spacing or ratchet wheel 1924. The manner in which motion is communicated from the ratchet wheel 1924 to the platen involves features of construction forming a part of the invention as will now be set forth.

*Connections for normal platen feed action.*

Figure 7:
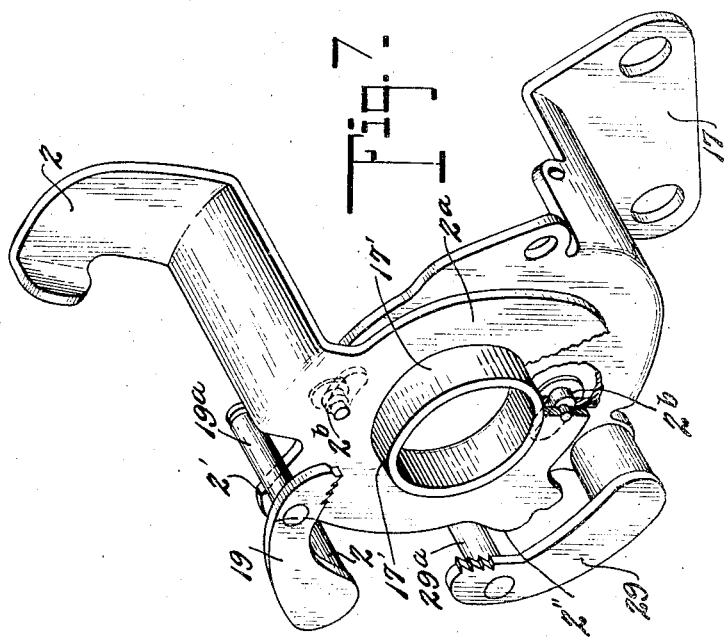
Fig. 7 is a view similar to Fig. 6, bringing out fully the arrangement of the handle and pawl disengaging means of the indicator restoring device.
Figure 8:
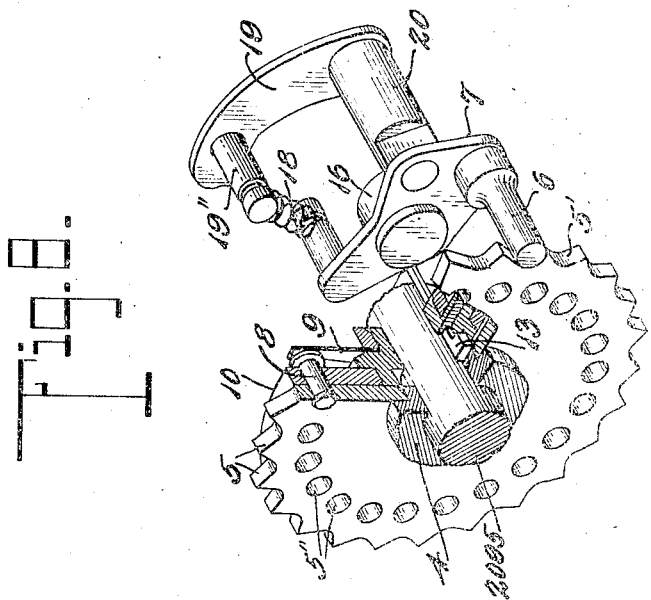
Fig. 8 is a perspective view partly in section, showing the tappet wheel construction and associated parts for connecting said wheel with the platen shaft and for transmitting motion from said wheel to the auxiliary indicator driving ratchet.

Referring particularly to Fig. 4, it will be observed that the platen 2096 is fixed to its shaft 2095 by means of a set screw 3 and the shaft 2095 is supported by the right side frames 1903 of the carriage by being mounted directly in the bearing sleeve 4, the latter being free to revolve in the side frame as well as about the shaft 2095 itself. The ratchet wheel 1924 is rigid on the sleeve 4 at the inner end of the latter, and at the inner side of the adjacent side frame 1903. Fixed to the other or outer end of the sleeve 4 is a tappet wheel 5 provided on its periphery as seen best in Fig. 8, with peripheral tappets or teeth 5', the number of which corresponds with the number of the teeth of the driving ratchet wheel 1924. The tappet wheel 5 is designed to perform a double function comprising an element of the connection intermediate the driving ratchet 1924 and the platen shaft 2095, and additionally forming an actuating device for the indicator as will be later set forth.

Describing the functioning of the member 5 as an element of the driving connection above mentioned, it may be noted that the tappet wheel is formed with a plurality of holes arranged in a circular path adjacent to the teeth 5', and at the outer side of the wheel 5 is disposed a pin carrier in the form of a disk 10. The carrier 10 is equipped with a plurality of pins 8 of a number exceeding by one the number of the holes or openings in the tappet wheel 5. Said disk 10 is rigidly mounted on a hub 11 supported by the shaft 2095 and said hub 11 has fixed thereto by means of a collar 12 a spider comprising a plurality of radiating spring fingers 9, one finger for each of the pins 8. The fingers 9 are so disposed that at their outer ends they bear against the outer ends or heads of the pins 8 and thereby tend to force these pins into those of the openings or holes in the tappet wheel 5 which happen to be positioned opposite the pins. Owing to the relative number of said holes, and the pins 8, it is obvious that there will always be one pin 8 of the carrier 10 which will be positioned so that it can enter a hole in the wheel 5, and owing to this condition the resilient fingers 9 are made necessary, those of these fingers whose pins are not opposite holes in the wheel 5 being capable of yielding when an imperforate portion of the wheel 5 is opposite the co-operating pin of the same, as will be readily obvious.

The hub 11 is provided with a feather or key-way adapted to receive a long longitudinally slidable key 13 which is disposed in a key-way formed lengthwise of the shaft 2095 and in this manner the hub 11 is fixed for rotation with said shaft, the formation of the key 13, however, permitting of slight longitudinal movement of the hub relatively to the shaft for a purpose to be shortly described.

The foregoing described arrangement and construction of the parts affords a positive driving connection intermediate the ratchet 1924 and the shaft 2095, the turning movement of the ratchet being initially communicated to the hub 4 thereby rotating the tappet wheel 5 and the tappet wheel 5 being interengaged with the pin carrier 10 causes simultaneous turning of the latter. The pin carrier being keyed or fixed for rotation with the shaft 2095 will normally cause the motion communicated to the ratchet wheel 1924 to be imparted to the shaft 2095, thereby correspondingly rotating the platen 2096 secured to said shaft. Any step by step movement imparted to the ratchet wheel while the said driving connection is established will be imparted to the platen.

*Manual adjustment of platen for type alinement.*

At the extreme outer end of the shaft 2095, see Fig. 4, is located the knob 2066, said knob being secured by a cross pin 14 to the key 13, through which the cross pin passes. At its innermost end the key 13 has a radial projection engaging a shoulder formed by an annular internal groove at the inner end of the sleeve 11. Normally the sleeve 11 is maintained in a position wherein the parts 5 and 8 are interengaged, owing to the provision of a coiled spring 15 which bears endwise against the outer end of the sleeve.

With the above construction of parts in mind, it will be evident that it is possible for the operator to pull outwardly upon the knob 2066 and thus cause the projection at the inner end of the key 13 to engage and pull outward on the hub 11, compressing the spring 15. By this action the several pins 8 are movable sufficiently to disengage the same from the tappet wheel 5, whereupon the platen 2096 is susceptible of being rotated freely by turning of the knob 2066 and thus imparting corresponding movement to the shaft 2095. When freely rotatable by the knob 2066 in the above manner it will be evident that the platen 2096 is susceptible of being adjusted readily for purposes of alining indicia on paper passing about the platen with the type of the type carriers, which type act upon the platen in the usual manner. Or the adjustment of the platen in the above manner may be utilized for any desired purpose where such adjustment is desirable, to facilitate a proper printing action of the type coöperating with the platen 2096, with respect to the strip of paper interposed between the platen and said type in the customary impression operations.

It is apparent that when the desired adjustment of the platen 2096 has been obtained the knob 2066 may be released and the spring 15 will force the hub 11 to its normal position and effect interlocking of the tappet wheel 5 and the pin carrier 10 no matter what the degree of relative movement of these parts may be as an incident to the turning of the platen in the adjusting operation described. The capability of obtaining the prompt interengagement of the pins 8 and the tappet wheel 5 is effectuated through the disproportion in the relative numbers of the pins 8 and the holes 5'' of the wheel 5. This proportion is such that there is always one pin 8 ready to engage in a selected one of the holes 5'' even though the remaining pins are detained from such engagement by non-registration of holes adjacent to the same. The foregoing is clearly illustrated in Fig. 10 of the drawings and affords a construction in which an exceedingly wide range of fractional adjustments of the parts 5 and 10 is obtainable without preventing the interlocking of these parts once the desired adjustment of the platen 2096 has been secured.

*The reducing drive gearing for indicator.*

As before premised, I contemplate the employment of an indicator in association with the platen and susceptible of being actuated synchronously with the platen in such a manner that an operator of the machine may be advised both visually and audibly when a predeterminate number of increments of movement of the platen have been performed, which movements it may be presupposed will be such as to have fed a sheet of paper or strip of printing tape operating about the platen to a point where stoppage of printing, at least for the time being, is desired.

Owing to the particular form of the platen and customary considerations appertaining to this particular art of accounting machines, especially the consideration of economy of space, it is obviously desirable that any indicating means employed shall be compact and susceptible of quick, ready restoration normally. With these factors in view, I employ an indicator which is adapted to be driven directly from the feed ratchet wheel 1924 of the platen and I am enabled to make my indicator comparatively small yet capable of accounting for the maximum requirements so far as number of feed movements indicated by it are concerned, by the utilization of a reducing drive gearing intermediate the ratchet 24, or parts actuated thereby, and the indicator proper.

It has been previously suggested that the wheel 5 is formed with the tappets 5' and these tappets engage with the tappet pin 6 on a lever 7 which is supported by a pivot stud 16 carried by a bracket 17 attached to the outer side of the side frame 1903, as seen in Fig. 4. The arrangement of the lever 7 and the disposition of the bracket 17, which has a peculiar formation so that it may project outward from the side frame 1903 into the casing which forms the indicator 1, are seen best in Figs. 5 to 8 inclusive. Since the tappet wheel 5 is given an increment of movement each time an increment of feeding movement is imparted to the ratchet wheel 1924, it is obvious that the wheel 5 is capable of causing a rocking movement of the lever 7 every time the wheel 5 is actuated. The said rocking movement of the lever 7 is employed to actuate a feed pawl 19 which is supported by a stud 20 rigid on the lever 7, said feed pawl being formed with a plurality of teeth engageable with an auxiliary ratchet wheel 21. The tappet pin 6 of the lever 7 is held in contact with the tappets or teeth 5' of the wheel 5 by a spring 18, see Fig. 8, said spring being secured at one end to a stud carried by the lever 7 and the other end of the spring being secured to a stud 19' projecting from the pawl 19.

The auxiliary ratchet wheel 21 is preferably provided with twenty-five teeth and is mounted rotatively upon a sleeve 22, said sleeve being fixed to the shaft 2095 by the pin connection 22'. At one side the ratchet wheel 21 has riveted or otherwise secured thereto a cup-shaped spring clutch driving member 23 and on its opposite side there is similarly secured to the wheel 21 a cup-shaped toothed detent member 24. The detent member 24 is somewhat larger than the member 23 and the parts 21, 23 and 24 are rotatable by the pawl 19 as the latter is intermittently actuated by the feeding operation of the ratchet wheel 1924. Owing to the provision on the pawl 19 of four finely spaced feeding teeth 19'', the distance between which is equal to one-fourth of the distance between the teeth of the auxiliary ratchet wheel 21, it is obvious that a single actuation of the pawl 19 will be sufficient only to turn the ratchet wheel 21 a distance equal to one-fourth of the distance between two of the regularly spaced teeth of said ratchet wheel. Four actuations of the lever 7, therefore, are required in order to rotate the ratchet wheel 21 a distance equivalent to the space between two teeth of said wheel, and owing to this reducing driving connection it will be evident that one hundred increments of movement of the platen will have to be imparted thereto in order to turn the ratchet wheel 21 a single complete revolution, there being approximately 27 teeth on the platen feed ratchet wheel 1924.

The indicator.

The indicator is designated 1, as before mentioned, and comprises virtually a casing which is advantageously utilized in my invention to house practically all of the various operating parts that have been heretofore described, excepting the ratchet wheel 1924, the knob 2066, and perhaps one or two other members. A hub 25 on the shaft 2095 has the indicator 1 rigidly secured thereto and also fixed to said hub adjacent to the outer end of the indicator is the detent clutch member 26 formed with teeth corresponding with and adapted to engage the peripheral teeth of the clutch member 24 previously mentioned. The teeth of the parts 24 and 26 are of a number equivalent to the number of external graduations which, as seen in Fig. 4, are provided on the exterior of the casing 1, said graduations being adapted to indicate the number of movements which are to be given to the platen when performing a designated operation in the use of the invention, as for instance the printing of a certain number of items on a sheet or tape fed forward by the platen. There will be provided at a suitable place on the side frame 1903, as shown in Fig. 4, an indicating pointer 28 opposite which the zero designation of the graduations of the indicator 1 may be caused to be positioned, and when in such position the indicator is restored or at normal ready to be adjusted to start its indicating operation for the work in hand.

The purpose in providing the detent clutch members 24 and 26 is to permit the indicator to be initially set for a particular number of increments of movement in order to perform its visual and audible indicating functions. Supposing, therefore, that it is desired to print a certain number of items on the sheet or tape passing around the platen 2096, as an incident to which eighty increments of movement must be imparted to the platen. To set the indicator properly for such operation the operator will take hold of the outer knurled portion 1' of the indicator, pull outwardly upon the same as seen in Fig. 4, and then turn the indicator until the number 80 opposite the graduations thereon is opposite to the indicating pointer 28 previously referred to. The outward pull on the indicator 1 causes a spring 27 engaging the hub 25 to be compressed, the detent clutch member 26 being at the same time disengaged from its opposing clutch member 24 so as to permit the free turning movement whereby the indicator is preliminarily adjusted. Release of the outward pull on the indicator and re-engagement of the parts 24 and 26 maintains the indicator at the predetermined adjustment.

The indicator according to the above operation is now ready to be operated intermittently through the action of the ratchet 1924, the movement of which is communicated through the parts 5, 6, 7 and 19 to the ratchet wheel 21. The ratchet wheel 21 by the intermittent actuation of the ratchet wheel 1924 will be turned in the proper direction to gradually restore the indicator 1 to its zero position.

Of course as soon as the indicator 1 reaches its zero position the condition is visually made known to the operator that the desired number of movements of the platen, eighty in the present instance, have been performed and the particular operation referred to is thus made known to the operator as practically completed. In order to insure that the operator may be advised of the condition stated, however, it is preferred to utilize an audible signal.

The audible signal.

The audible signaling means includes a projection 1'' located interiorly of the casing or indicator 1 and so arranged that as the indicator reaches its zero position said projection engages a pawl member 34 carried by a clapper member 33. The clapper member 33 is pivotally mounted on a stud 32 carried by the bracket 17 which it will be remembered projects into the indicator 1 a considerable distance. The engagement between the projection 1'' and the part 34 is sufficient to trip the clapper member 33 and thereby cause the latter to engage with the indicator, the latter acting as a sort of bell in order to perform the function of an audible signal.

Manual release means for indicator.

Under certain conditions it will be evident that it may be desired to restore the indicator 1 to its zero position quickly, notwithstanding that the number of increments of ratchet movement to be imparted from the ratchet wheel 1924, and necessary to zeroize the indicator owing to the setting thereof, have not been performed. An instance of this sort arises where items which are being listed run out in the middle of a page and previous, of course, to the restoring of the indicator through the action of the platen drive mechanism. With a view to facilitating restoration of the indicator under conditions such as just stated, I utilize a restoring device which includes primarily the spring or slippage clutch member 23. It will be recalled that the member 23 is fixed to the ratchet wheel 21 and between the periphery of the member 23 and the hub flange 17' of the bracket 17 is located the helical spring 30, the inner end of which is fixed to said hub flange 17' and the outer end of which has a slippage or frictional engagement with the inner surface of the part 23. The functioning of the spring 30 is such that it tends to turn the member 23 and all parts which may be connected or engaged therewith directly or indirectly, such as the ratchet wheel 21, the clutch parts 24 and 26 and the indicator 1, etc., to a position wherein the indicator 1 is at zero adjustment. As the ratchet wheel 21 is turned during the operation of the indicator 1 from the main ratchet wheel 1924, the corresponding movement of the member 23 has a tendency to cause winding up or reduction of the diameter of the spring 30. Such winding up action continues until the resetting tendency of the spring causes slippage of its outer end in respect to the member 23. With the above arrangement and coöperation of parts in mind it will be observed from Figs. 4, 6 and 7 particularly that I provide a handle 2 extending radially from the indicator 1 adjacent to its inner open end. Said handle 2 is a part of a cam member 2ª supported on the hub flange 17' of the bracket 17 for rotative movement, and having pin and slot connections as shown at 2ᵇ with said brackets. The cam member 2ª is provided with cams 2' adapted to operate against studs 19ª and 29ª which project from the feed pawl 19 and the detent pawl 29, respectively, which coact with the auxiliary ratchet wheel 21. It will be evident that by slightly pressing against the handle 2 and thereby turning the cam member 2ª the cams 2' will elevate the pawls 19 and 29 sufficiently to disengage these pawls from the ratchet wheel 21. When the ratchet wheel 21 is disengaged from the pawls 19 and 29, said ratchet wheel becomes subject to the action of the restoring spring 30 which operates on the member 23 in the manner previously described. The release of the ratchet wheel 21 therefore permits the spring 30 to move the parts 23, 21, 26, 24 and 1 to a zero position. The zero position obtained by the release action aforesaid is determined by the provision on the outer periphery of the member 23 of a stop 23', seen best in Fig. 6, said stop being adapted to engage with a pawl 31 pivoted to the bracket 17 and seen best also in Fig. 6.

Having thus described my invention, what is claimed as new is:—

1. In combination, a platen, a shaft on which the platen is mounted, platen feeding mechanism including a line spacing wheel, a handle connected with said shaft for turning the platen, operative connections adjustably connecting the line spacing wheel with the shaft and including a connecting wheel adapted to rotate with the ratchet wheel and provided with openings therein, a pin carrier adjacent to said connecting wheel and fixed to the shaft, a series of pins carried by said pin carrier and any one of which is adapted to engage in a selected opening of the connecting wheel, and a connection between the pin carrier and handle whereby certain movement of the latter controls engagement and disengagement of the said pins with the connecting wheel.

2. In combination, a platen, a shaft on which the platen is mounted, platen feeding mechanism including a line spacing wheel, a handle connected with and shiftable longitudinally of said shaft and rotative for turning the platen, operative connections adjustably connecting the ratchet wheel with the shaft and including a connecting wheel adapted to rotate with the ratchet wheel and provided with openings therein, a pin carrier adjacent to said wheel and fixed to the shaft, a series of pins carried by said pin carrier and any one of which is adapted to engage in a selected opening of the connecting wheel, means whereby the interengagement of the said pins with the connecting wheel is controlled by the shifting of said handle longitudinally of the shaft, including a sleeve on which the pin carrier is mounted, spring fingers on said sleeve engaging the pins to normally tend to project them into engagement with the connecting wheel, and a part connected with the handle and arranged to shift said sleeve as an incident to said longitudinal movement of the handle.

3. In combination, a platen, a shaft on which the platen is mounted, platen feeding mechanism including a ratchet wheel, a handle connected with said shaft for turning the platen, operative connections adjustably connecting the ratchet wheel with the shaft and including a connecting wheel adapted to rotate with the ratchet wheel and provided with openings therein, a pin carrier adjacent to said wheel and fixed to the shaft, a series of pins carried by said pin carrier and any one of which is adapted to engage in a selected opening of the connecting wheel, means whereby the interengagement of the said pins with the connecting wheel is controlled from said handle, said connecting wheel being provided with tappets, an indicator carried by said shaft, and actuating means intermediate the tappets aforesaid to cause turning of the indicator incidental to the actuating movement of the ratchet wheel.

4. In combination, a platen, a shaft on which the platen is mounted, platen feeding mechanism including a ratchet wheel, a handle connected with said shaft for turning the platen, operative connections adjustably connecting the ratchet wheel with the shaft and including a connecting wheel adapted to rotate with the ratchet wheel and provided with openings therein, a pin carrier adjacent to said wheel and fixed to the shaft, a series of pins carried by said pin carrier and any one of which is adapted to engage in a selected opening of the connecting wheel, means whereby the interengagement of the said pins with the connecting wheel is controlled from said handle, said connecting wheel being provided with tappets, an indicator carried by said shaft, actuating means intermediate the tappets aforesaid to cause turning of the indicator incidental to the actuating movement of the ratchet wheel, and clutch mechanism intermediate said indicator and the shaft operable to permit free preliminary setting of the indicator independently of the shaft.

5. In combination, a platen, a shaft connected therewith to turn the same, feed mechanism for the platen comprising a main line spacing wheel, a handle for turning said shaft, connections between said main wheel and the shaft operable by said handle, an indicator associated with the shaft, and releasable connections between said indicator and the wheel permitting movement of the indicator with the wheel and independently of said wheel.

6. In combination, a platen, a shaft connected therewith to turn the same, feed mechanism for the platen comprising a main ratchet wheel, a handle for turning said shaft, connections between said main ratchet wheel and the shaft operable by said handle, an indicator associated with the shaft, and releasable connections between said indicator and the ratchet wheel permitting movement of the indicator with the ratchet wheel and independently of said ratchet wheel, said releasable connections including an auxiliary ratchet wheel mechanism intermediate the main ratchet wheel and the indicator.

7. In combination, a platen, a shaft connected therewith to turn the same, feed mechanism for the platen comprising a main ratchet wheel, a handle for turning said shaft, connections between said main ratchet wheel and the shaft operable by said handle, an indicator associated with the shaft, releasable connections between said indicator and the ratchet wheel permitting movement of the indicator with the ratchet wheel and independently of said ratchet wheel mechanism intermediate the main ratchet wheel and the indicator, means to render said releasable connections inactive, and means normally tending to restore the indicator to a predetermined normal position when said connections are rendered inactive.

8. In combination, a platen, an operating shaft carrying said platen, feed mechanism for the platen including a ratchet wheel, adjustable connections intermediate the ratchet wheel and the shaft, a handle for said shaft arranged to operate said connections, an indicator, and operating connections between said ratchet wheel and the indicator, the indicator being constructed so as to substantially inclose the adjustable connections aforesaid and also the operating connections for the indicator.

9. In combination, a platen, a line spacing wheel therefor, operative connections between the platen and said wheel, a handle connected with the platen and rotative to turn the same and mounted for other than said rotative movement, and means intermediate the handle and said operative connections to render the latter inactive as an incident to said other movement of the handle.

10. In combination, a platen, a shaft connected thereto for actuating the same, feed mechanism for the platen including a wheel, an indicator mounted on the shaft, a tappet wheel connected with said first named wheel to move therewith, and ratchet mechanism operated by said tappet wheel for communicating movement to the indicator.

11. In combination, a platen, a shaft connected thereto for actuating the same, feed mechanism for the platen including a wheel, an indicator mounted on the shaft, a tappet wheel connected with said first named wheel to move therewith, ratchet mechanism operated by said tappet wheel for communicating movement to the indicator, spring means normally tending to return the indicator to a predetermined position, and means for rendering said normally active connections inoperative whereby to permit the spring means to act upon the indicator.

12. In combination, a platen, a shaft connected thereto for actuating the same, feed mechanism for the platen including a wheel, an indicator mounted on the shaft, a tappet wheel connected with said first named wheel to move therewith, ratchet mechanism operated by said tappet wheel for communicating movement to the indicator, spring means normally tending to return the indicator to a predetermined position, and means for rendering said normally active connections inoperative whereby to permit the spring means to act upon the indicator, said normally active connections including a clutch adapted to admit of presetting the indicator to a position from which it will be returned to normal as an incident to turning movement of the platen.

13. Platen mechanism for accounting machines, comprising in combination, a platen, feeding mechanism therefor including a ratchet wheel, releasable connections between the wheel and platen, and means to actuate said connections and operable to move the platen in opposite directions when the connections are released and in one direction when the connections are active.

14. Platen mechanism for accounting machines, comprising in combination, a platen, feeding mechanism for imparting intermittent regular movement to the platen, a platen shaft to which the platen is attached, a handle connected with said shaft to operate the same, and connections intermediate the feeding mechanism and the shaft such that when released the shaft is rotatable in opposite directions by said handle while normally said connections permit rotation of the shaft in only one direction by the handle.

15. In combination, a platen, a line spacing wheel therefor, operative connections between the platen and said wheel, a handle connected with the platen and rotative to turn the same and mounted for other than said rotative movement, and means intermediate the handle and said operative connections to render the latter inactive as an incident to said other movement of the handle and to adjust said operative connections as an incident to rotative movement of said handle.

16. In combination, a platen, a shaft for supporting same, a line spacing wheel connected with the platen, a handle connected with the shaft to turn the same and mounted to slide lengthwise of said shaft, operative connections between the shaft and said line spacing wheel, means whereby sliding movement of the handle on the shaft will render said operative connections inactive and whereby rotative movement of said handle will adjust said operative connections.

17. Platen mechanism for accounting machines comprising in combination, a platen, a shaft with which the platen is connected, a ratchet wheel for operating the platen, connections between the wheel and shaft, an indicator operable with the platen and housing said connections, and means to render said connections inactive at will operable from a point exterior to the indicator.

18. In combination, platen mechanism comprising a platen and feeding means for moving said platen, an indicator operable with the platen to register the movements of the latter, means whereby to preliminarily set the indicator in a position to register a predetermined number of movements of the platen as a result of which the indicator is restored to a normal or zero position, means under manual control to cause a restoration of the indicator to zero position irrespective of movement of the platen including a spring motor, means for normally preventing restoration of the indicator by said motor, and a device to render the last named means inactive.

19. In combination, a platen, a shaft on which said platen is fixed, feed mechanism for the platen comprising a ratchet wheel, releasable connections intermediate the ratchet wheel and the shaft, an indicator housing said connections, means intermediate the ratchet wheel and the indicator for operating the latter to register movements of the platen by the ratchet wheel, means whereby the indicator may be actuated independently of said actuating means to set the indicator to a predetermined registering position, and means connected with the shaft for operating the releasable connections aforesaid.

20. In combination, a platen, and a shaft on which it is mounted, a feed ratchet wheel for said platen, an indicator mounted on said shaft, connections intermediate the ratchet wheel and the shaft housed by said indicator, an auxiliary ratchet wheel disposed in the indicator and operatively connected with the latter, and means to drive the auxiliary ratchet wheel from the main ratchet wheel.

21. In combination, a platen, and a shaft on which it is mounted, a feed ratchet wheel for said platen, an indicator mounted on said shaft, connections intermediate the ratchet wheel and the shaft housed by said indicator, an auxiliary ratchet wheel disposed in the indicator and operatively connected with the latter, and means to drive the auxiliary ratchet wheel from the main ratchet wheel in correspondence with the main ratchet wheel but with less degree of movement.

22. In combination, a platen, and a shaft on which it is mounted, a feed ratchet wheel for said platen, an indicator mounted on said shaft, connections intermediate the ratchet wheel and the shaft housed by said indicator, an auxiliary ratchet wheel disposed in the indicator and operatively connected with the latter, means to drive the auxiliary ratchet wheel from the main ratchet wheel, a handle carried by said shaft and operatively connected with the connections aforesaid whereby to render said connections inactive, and means whereby the indicator may be disconnected from the auxiliary ratchet wheel for facilitating preliminary setting of the indicator.

23. In combination, a platen and a shaft on which it is mounted, a feed ratchet wheel for said platen, an indicator mounted on said shaft, connections intermediate the ratchet wheel and the shaft housed by said indicator, an auxiliary ratchet wheel disposed in the indicator and operatively connected with the latter, means to drive the auxiliary ratchet wheel from the main ratchet wheel, a handle carried by said shaft and operatively connected with the connections aforesaid whereby to render said connections inactive, means whereby the indicator may be disconnected from the auxiliary ratchet wheel for facilitating preliminary setting of the indicator, a motor associated with the auxiliary ratchet wheel for restoring the same to a normal or zero position, and manual means for controlling the action of said motor on said auxiliary ratchet wheel.

24. In combination, a platen, a shaft on which the platen is fixed, a main feeding ratchet for said platen, a sleeve on said shaft carrying said ratchet wheel, a tappet wheel carried by said sleeve to move therewith and with the ratchet wheel, a pin carrier on the shaft rotatable with the shaft, pins detachably connecting said carrier with the tappet wheel, spring means normally holding the pin carrier in a position maintaining said pins in connection with the tappet wheel, an indicator housing said tappet wheel, pin carrier, pins and spring, a handle connected to the shaft and connected with the pin carrier and arranged externally of the indicator and operable to disengage the pins from the tappet wheel and to cause turning of the shaft independently of the ratchet wheel, and means to actuate the indicator from said ratchet wheel.

25. In combination, a platen, a shaft on which the platen is fixed, a main feeding ratchet for said platen, a sleeve on said shaft carrying said ratchet wheel, a tappet wheel carried by said sleeve to move therewith and with the ratchet wheel, a pin carrier on the shaft rotatable with the shaft, pins detachably connecting said carrier with the tappet wheel, spring means normally holding the pin carrier in a position maintaining said pins in connection with the tappet wheel, an indicator housing said tappet wheel, pin carrier, pins and spring, a handle connected to the shaft and connected with the pin carrier and arranged externally of the indicator and operable to disengage the pins from the tappet wheel and to cause turning of the shaft independently of the ratchet wheel, means to actuate the indicator from said ratchet wheel comprising a tappet lever, an auxiliary ratchet wheel within the indicator, means on the tappet lever to actuate the auxiliary ratchet wheel, and a connection intermediate said auxiliary ratchet wheel and the indicator operable to permit preliminary setting movement of the indicator independently of the first named ratchet wheel, and means intermediate the tappet wheel and said lever to actuate the lever from the tappet wheel.

26. In combination, a platen, a shaft on which the platen is fixed, a main feeding ratchet for said platen, a sleeve on said shaft carrying said ratchet wheel, a tappet wheel carried by said sleeve to move therewith and with the ratchet wheel, a pin carrier on the shaft rotatable with the shaft, pins detachably connecting said carrier with the tappet wheel, spring means normally holding the pin carrier in a position maintaining said pins in connection with the tappet wheel, an indicator housing said tappet wheel, pin carrier, pins and spring, a handle connected to the shaft and connected with the pin carrier and arranged externally of the indicator and operable to disengage the pins from the tappet wheel and to cause turning of the shaft independently of the ratchet wheel, means to actuate the indicator from said ratchet wheel comprising a tappet lever, an auxiliary ratchet wheel within the indicator, means on the tappet lever to actuate the auxiliary ratchet wheel, a connection intermediate said auxiliary ratchet wheel and the indicator operable to permit preliminary setting movement of the indicator independently of the first named ratchet wheel, means intermediate the tappet wheel and said lever to actuate the lever from the tappet wheel, a spring coöperative with the auxiliary ratchet wheel to return the latter to a normal or zero position and cause corresponding movement of the indicator detent means for normally preventing such action of the spring on the auxiliary ratchet wheel, and a handle operable to render said detent means inactive whereby the spring may act to return the auxiliary ratchet wheel and indicator to a normal or zero position.

27. In platen mechanism for accounting machines, a platen and an indicator mounted on the same shaft, drive mechanism for the platen, and operating means for actuating the indicator incident to actuation of the platen, said last named means being housed by the indicator.

28. Platen mechanism for accounting machines, comprising in combination, a platen, feeding mechanism therefor including a ratchet wheel, releasable connections between the wheel and platen, means to actuate said connections, and an indicator operable with the platen and housing said connections.

In testimony whereof I affix my signature.

AMOS H. HAWLEY.